[19] United States Patent
Onogi et al.

[11] Patent Number: 4,797,826
[45] Date of Patent: Jan. 10, 1989

[54] SPEED CONTROL SYSTEM FOR VEHICLES

[75] Inventors: Nobuyoshi Onogi; Mamoru Shimamoto, both of Nagoya; Yoshio Shinoda, Aichi, all of Japan

[73] Assignee: Nippondenso Co., Ltd., Kariya, Japan

[21] Appl. No.: 737,657

[22] Filed: May 24, 1985

[30] Foreign Application Priority Data

May 31, 1984 [JP] Japan .................. 59-112297

[51] Int. Cl.$^4$ ................................ B60K 31/04
[52] U.S. Cl. .................. 364/426.04; 180/171; 180/179; 123/351
[58] Field of Search ............ 364/426, 431.07; 123/351, 352; 180/170, 171, 179, 176

[56] References Cited

U.S. PATENT DOCUMENTS

| | | | |
|---|---|---|---|
| 4,354,467 | 10/1982 | Noddings et al. | 123/352 |
| 4,419,729 | 12/1983 | Krieder | 364/426 |
| 4,467,428 | 8/1984 | Caldwell | 364/426 |
| 4,479,184 | 10/1984 | Nakano | 364/426 |
| 4,537,272 | 8/1985 | Tanigawa et al. | 123/352 |
| 4,540,060 | 9/1985 | Kawata et al. | 364/426 |
| 4,560,024 | 12/1985 | Noda | 123/352 |

Primary Examiner—Gary Chin
Attorney, Agent, or Firm—Cushman, Darby & Cushman

[57] ABSTRACT

In a speed control system for a vehicle, when a desired running speed of the vehicle is to be preset, the desired running speed of the vehicle is compared with the actual running speed so that when the resulting difference between the desired running speed and the actual running speed exceeds a predetermined range, the operation of presetting the desired running speed is limited.

7 Claims, 3 Drawing Sheets

SPEED CONTROL SYSTEM FOR VEHICLES

BACKGROUND OF THE INVENTION

1. Field of the Invention

The present invention relates to a speed control system for vehicles which is suited for maintaining constant speed control, and more particularly the invention relates to such a type of system which makes it possible to preset any desired running speed.

2. Description of the Prior Art

Known systems of the above type include, as for example disclosed in Japanese Laid-Open patent application No. 58-128437, a resistor for varying the desired running speed and a switch for presetting the desired driving speed indicated by the resistor. By thus making it presettable, any desirable running speed can be obtained easily and this is convenient.

However, the conventions systems are disadvantageous in that since any desired running speed selectable by the resistor can be preset easily, there is the danger of inadvertently making an extreme speed change from a constant speed to a higher speed or vice versa.

SUMMARY OF THE INVENTION

It is an object of the present invention to provide an improved speed control system for vehicles which eliminates the foregoing disadvantage of the conventional systems.

To accomplish the above object, in accordance with the present invention there is thus provided a speed control system for vehicles including means for comparing a desired running speed to be preset with the actual running speed and means for limiting the presetting when the result of the comparison shows that the difference between the desired running speed and the actual running speed is greater than a predetermined value.

The limiting means may for example be designed so as to disable the presetting and it may also be designed to give the corresponding indication to the driver. Further, it may be designed so that the presetting is disabled only temporarily and the disabled state is released when the driver continues to effect the presetting.

In accordance with the invention, when the actual running speed deviates extremely from a desired running speed to be preset, to control the vehicle to run at this desired running speed is immediately limited or prevented.

DESCRIPTION OF THE PREFERRED EMBODIMENTS

Figure 1:
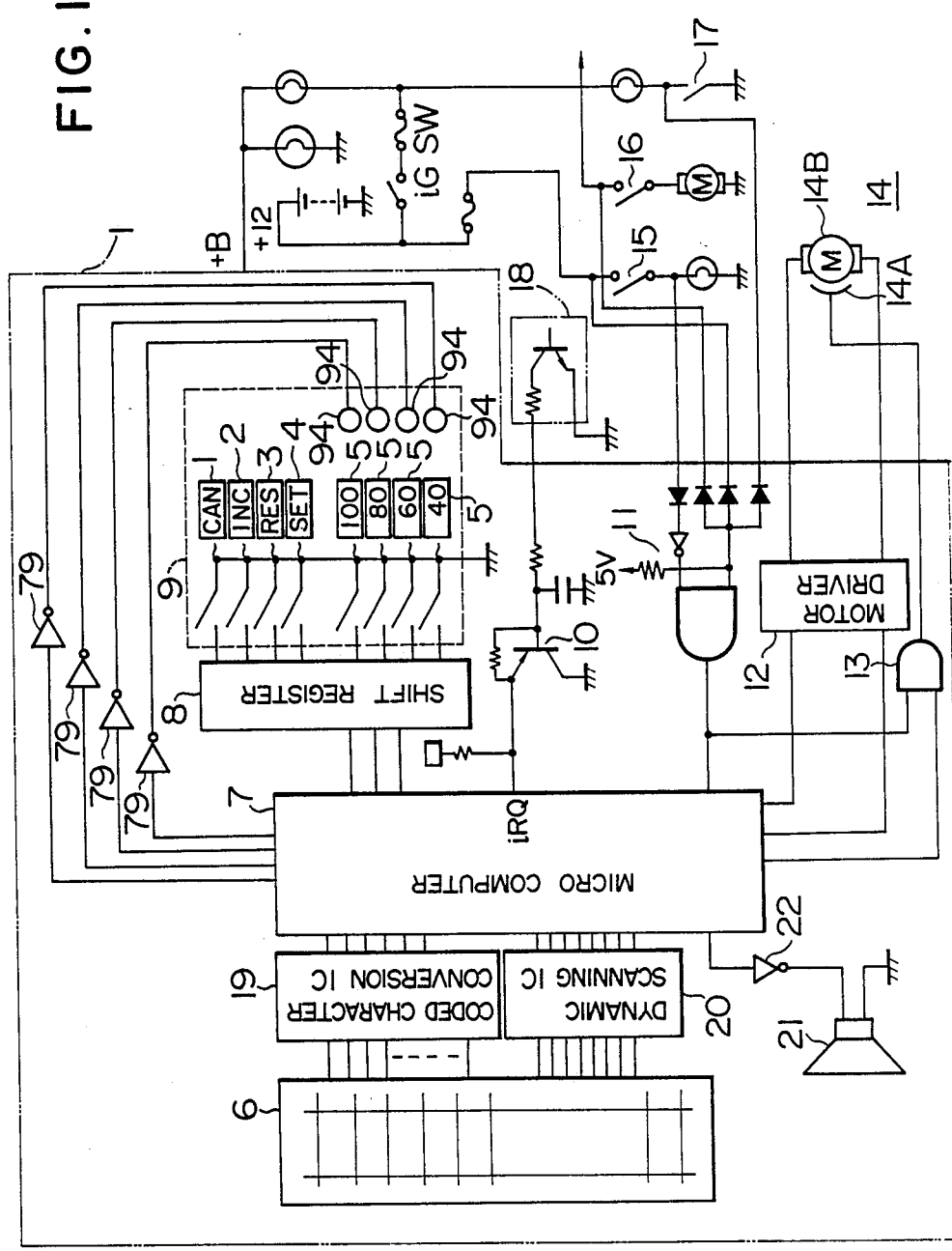
FIG. 1 is an electric wiring diagram showing the overall construction of a speed control system according to an embodiment of the invention.

FIG. 1 is an electric wiring diagram showing a speed control system for vehicles to which the invention is applied. In the Figure, an electric control circuit 1 includes a microcomputer 7. A vehicle speed signal generated from a vehicle speed sensor 18 is applied through a noise filter 10 to an interrupt port iRQ of the microcomputer 7. The microcomputer 7 computes the actual running speed of the vehicle at intervals of each pulse signal of interrupt signals in accordance with a vehicle speed computing program which is already known and will not be described.

Figure 2:
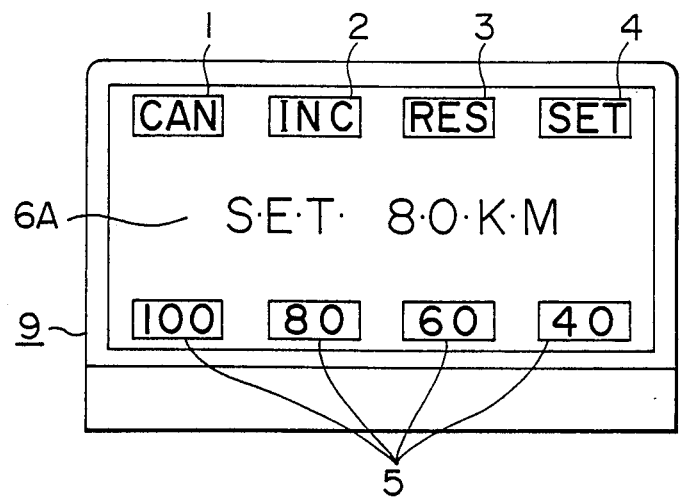
FIG. 2 is a plan view of a control panel.

Signals from a control panel 9 having its display surface shown in FIG. 2 are stored in the RAM of the microcomputer 7 through a shift register 8 (e.g., the Toshiba TC4014). In FIG. 2, numerals 1 to 5 designate self-restoring switches including a cancel switch 1, an increase switch 2, a resume switch 3, a set switch 4 and switches 5 for presetting a plurality of desired running speeds. The control panel 9 also includes a display surface 6A of fluorescent display tubes for displaying a desired running speed.

When any one of a brake switch 15, a neutral safety switch 16 and a parking brake switch 17 is connected by its operation, the output of a logic circuit 11 goes from a high level to a low level and the output is applied as a control stop signal to the microcomputer 7. This signal is also used, along with an output of the microcomputer 7, as a signal for closing a control gate 13.

A motor actuator 14 is provided to adjust the opening of the engine throttle valve which is not shown and its clutch 14A is coupled and decoupled in accordance with the output signals from the control gate 13. The rotation of an actuator motor 14B is controlled by a motor driver 12 (the Mitsubishi Electric M54542L) which is operated by the microcomputer 7.

Fluorescent display tubes 6 are arranged in the form of eight 7×5 dot matrix displays. The microcomputer 7 applies character codes to a display conversion integrated circuit 19 and it also causes the fluoresent display tubes 6 to give alphanumeric displays through a dynamic scanning fluoresent display tube driver 20 (the Hitachi HA16619). A buzzer 21 serving as indicating means is operated by an output signal from the microcomputer 7 through an inverter 22.

Figure 3A:
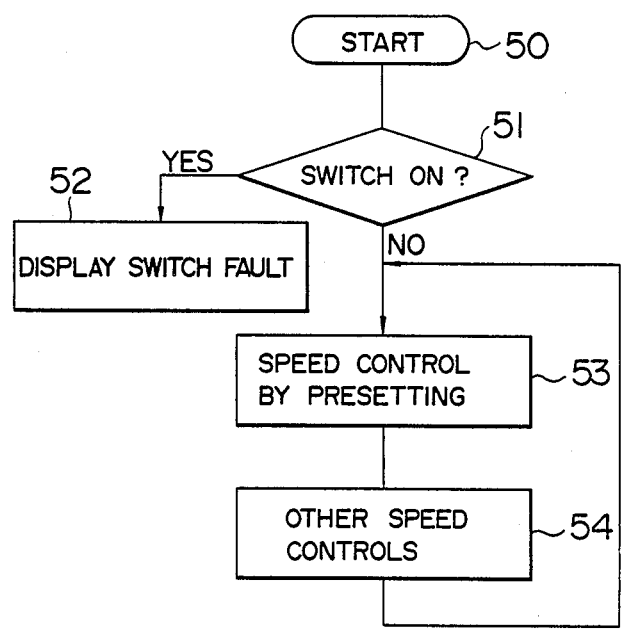
FIGS. 3A and 3B are flow charts showing the control programs of a microcomputer.
Figure 3B:
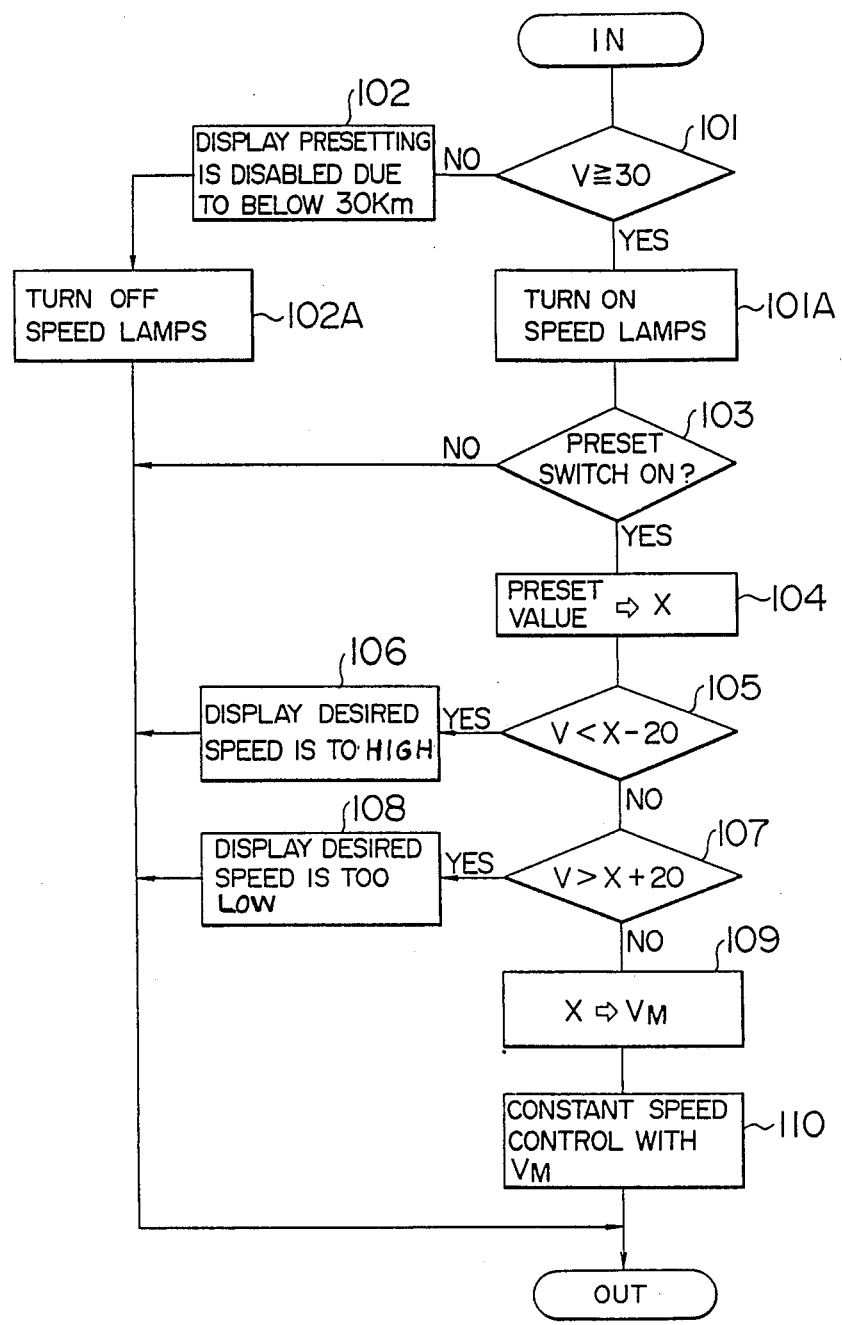

FIG. 3A is a flow chart of a start program performed prior to the execution of a constant speed drive control program. At a step 50, the execution of the program is started in response to the supply of power upon the closing of the key switch. At a step 51, the operation of any of the switches 1 to 5 of the control panel 9 is discriminated. If any of the switches 1 to 5 is turned on just after the closing of the key switch, it is considered that the control panel 9 is faulty. At a step 52, the circuits 19 and 20 are controlled to give an indication of the faulty control panel switch on the display surface 6A of the control panel 9. Then, the microcomputer 9 stops the program at this step and the other steps are not performed. At a step 53, the program shown in FIG. 3B is executed. At a step 54, the other known speed controls are performed in accordance with the indications by the switches 1 to 4.

FIG. 3B shows one of the control programs preliminarily stored in the microcomputer 7, that is, the program pertinent to the present invention which presets a desired running speed and performs a constant speed control of the vehicle.

The program will now be described in accordance with the procedure of its execution. In the Figure, a step 101 determines whether the actual running speed indicative of data V is over a threshold, for example, in this embodiment, 30 Km/h or over. If it is not, a transfer is made to a step 102 where the desired character codes are displayed by the fluorescent display tubes 6 and also the buzzer 21 is operated to sound. In this case, the displays show "LOW 30KM". If it is, a transfer is made to a step 101A where indicating lamps 94 adjacent to the preset switches 5 (100 Km/h, 80 Km/h, 60 Km/h, 40 Km/h) are selectively turned on through drive circuits 79. In this case, the indicator lamp(s) indicative of the preset speed(s) between an upper limit of $+20$ Km/h and a lower limit of $-20$ Km/h of the actual running speed V or within the range $(V\pm 20)$ Km/h are selected and turned on. At a step 102A, all the indicator lamps 94 are turned off.

When the actual running speed is higher than the lower speed limit, the closing of any of the preset switches 5 is determined at a step 103. If it is, a transfer is made to a step 104 where the selected preset value is stored as a data X in the temporary memory.

The content of the temporary memory represents the desired running speed to be preset and the next step 105 determines whether the data X is above a range predetermined in relation to the actual running speed V. In this case, if the desired running speed to be preset is higher than the actual running speed V by more than 20 Km/h, for example, a step 106 is performed and the constant speed control shown at a step 110 is not started, that is, the presetting is disabled (limited). At the step 106, the fluorescent display tubes 6 display "Hi SETV", for example, and simultaneously the buzzer 21 is operated to sound.

If the limitation of the step 105 is passed through, a step 107 determines whether the desired running speed to be preset is smaller than the actual running speed by more than 20 Km/h. If the difference is greater than this range, a step 108 is performed. At the step 108, the fluorescent display tubes 6 are caused to display "Low SETV" and also the buzzer 21 is operated to sound.

If the limitations of the steps 105 and 107 do not exist, a transfer is made to a step 109 where the data X is stored as a preset data $V_M$ indicative of the desired running speed. This desired running speed data $V_M$ is used as the desired running speed serving as a control point in the known constant speed drive control program shown at the next step 110 and the operation of the motor actuator 14 is controlled so as to maintain the actual running speed at the desired running speed.

Thus, in accordance with this system, when a desired running speed is to be preset, a decision is made as to whether the desired running speed is within a predetermined range with respect to the actual running speed. If it is not, the presetting is disabled and the reason for this is displayed.

In presetting, which one of the values is to be preset can be judged from the numerical values inscribed on the preset switches 5. Thus, the presetting is easy.

While, in the above-described embodiment, the presettable range is selected between the upper and lower limits of plus and minus 20 Km/h for the actual running speed, such presettable range may be predetermined for each of various vehicle speeds as shown in the following Table 1 or alternatively they may be preset by the driver or the like.

TABLE 1

| Preset Value | Presettable Range |
|---|---|
| 40 (Km/h) | 30 (Km/h)–70 (Km/h) |
| 50 | 30–80 |
| 60 | 30–90 |
| 70 | 40–120 |
| 80 | 50–120 |
| 90 | 60–120 |
| 100 | 60–130 |

When carrying out the invention, to arrange a large number of preset switches on the control panel is subject to a limitation in space and in order that n switches may be used to preset $2n-1$ desired running speeds which are greater than the number of the switches, it is possible to arrange the switches in such a manner that the simultaneous operation of the adjacent two switches results in the presetting of a desired running speed intermediary between the desired running speeds indicated by the two switches in accordance with a program which discriminates the operation of the switches.

In this case, the desired discriminating program may be prepared in the following simple form.

(a) Is a first switch turned on? If it is go to a step (b). If it is not go to a step (e).

(b) Is a second switch turned on? If it is, go to a step (c). If it is not, go to a step (d).

(c) Set a data X intermediary between the indications of the first and second switches.

(d) Set the data X as indicated by the first switch.

(e) Is the second switch turned on? If it is, go to a step (f). If it is not, . . . the rest is omitted.

(f) Is a third switch turned on? If it is, go to a step (g). If it is not, go to a step (h).

(g) Set the data X intermediary between the indications of the second and third switches.

(h) Set the data X as indicated by the second switch.

While the control programs shown in FIGS. 3A and 3B have been described with reference to the case in which the constant speed control of a vehicle is to be started in response to a presetting operation in the absence of any previous presetting, these programs may be modified so that when the constant speed control has already been set in operation by presetting, the desired running speed is changed by further presetting. In this case, it is only necessary to provide, after the step 106 or 108, an additional step for determining whether the constant speed control has already been set in operation so that if the result of the decision is affirmative, the step 110 is performed.

From the foregoing description it will be seen that the present invention is useful from the standpoint of safety driving in that the occurrence of any extreme speed change is prevented when presetting a desired running speed.

We claim:

1. A speed control system for a vehicle comprising:
preset means for selecting and presetting a desired running speed of a vehicle;
means for determining an actual running speed of said vehicle;
means for defining a lower limit running speed which is smaller than said desired running speed by a predetermined value and for defining an upper limit running speed which is larger than said desired running speed by said predetermined value;
means for comparing said actual running speed of said vehicle with said upper and lower limit running speeds;
means for permitting a control of the vehicle speed in accordance with said desired running speed only when said actual running speed is greater than said lower limit running speed and is less than said upper limit running speed; and
controlling means, responsive to said permitting means for controlling a vehicle speed to approach said desired running speed only when said permitting means permits said control.

2. A system according to claim 1, wherein said preset means comprises a plurality of preset switches, each indicating one of a plurality of desired running speeds which are stepwise changed to select said desired running speed.

3. A system according to claim 2, wherein said preset means comprises first means for presetting said desired running speed intermediary between running speeds indicated by two adjoining ones of said preset switches.

4. A system according to claim 1, further comprising display means responsive to a control signal from said permitting means, for displaying an indication that said controlling means is not controlling said vehicle speed in accordance with said desired running speed.

5. A system according to claim 4, wherein said display means is arranged adjacent to said preset means to visually display the desired running speed which is preset by said preset means and which is variable within a predetermined range in accordance with actual running speed of said vehicle.

6. A speed control system for vehicles comprising:
preset means for selecting and presetting a desired running speed of a vehicle;
detector means for detecting an actual running speed of the vehicle;
means for defining a limiting speed range, said limiting speed range being a function of said desired running speed, and for discriminating whether said actual running speed is within said limiting speed range; and
limiting means for inhibiting presetting of said desired running speed when said actual running speed is out of said limiting speed range.

7. A speed control system for a vehicle comprising:
detector means for detecting an actual running speed of the vehicle;
preset means for selecting and presetting a desired running speed of the vehicle; and
means for defining a presettable range which is between upper and lower limits centered around the desired running speed and separated therefrom by a given value, such as presettable range being different for each actual running speed of said vehicle; and
means for controlling a vehicle speed so as to cause said actual running speed to tend toward said desired running speed only when said actual running speed is within said presettable range.

* * * * *